United States Patent [19]
Brockman et al.

[11] Patent Number: 6,061,373
[45] Date of Patent: May 9, 2000

[54] SAFETY INTERLOCKING SYSTEM FOR AN OPTICAL FIBER AMPLIFIER AND PUMP SOURCE

[75] Inventors: Robert C. Brockman, Jackson; Paul Eisler; Ralph B. Jander, both of Freehold, all of N.J.

[73] Assignee: Tyco Submarine Systems, Ltd., Eatontown, N.J.

[21] Appl. No.: 09/170,646

[22] Filed: Oct. 13, 1998

[51] Int. Cl.[7] .............................. H01S 3/00; G08B 21/00
[52] U.S. Cl. ............................................. 372/38; 340/652
[58] Field of Search ............................ 372/38; 307/112; 315/362; 324/756; 340/652, 654

*Primary Examiner*—Samuel A. Turner
*Assistant Examiner*—Armando Rodriguez
*Attorney, Agent, or Firm*—Daniel N. Daisak

[57] ABSTRACT

A safety interlocking arrangement for use with a doped fiber amplifier and its associated pump source(s). A pair of metallized jumper cables are used to interconnect the amplifier and pump source, where the physically connections to the housings are electrically isolated. Within the pump source, an isolated power supply, in series with a control switch (such as an optical coupler) is connected between the isolated fiber coupling ports. Within the doped fiber amplifier, a diode is connected between the isolated amplifier fiber coupling ports. When the metallized jumper fiber cables are properly connected between the pump source and the amplifier, the electrical circuit is completed and a low level current will flow. The current activates the control switch within the pump source, where the control switch functions to turn "on" the pump source lasers. If either metallized jumper fiber is misconnected, broken or missing, no current will flow. Therefore, the control switch will remain open and the lasers will remain inactive.

10 Claims, 2 Drawing Sheets

SAFETY INTERLOCKING SYSTEM FOR AN OPTICAL FIBER AMPLIFIER AND PUMP SOURCE

BACKGROUND OF THE INVENTION

1. Technical Field

The present invention relates to a safety interlocking system for an optical fiber amplifier and an associated pump source and, more particularly, to a system that prevents the activation of the laser pump sources in the event of a disconnection (or incorrect interconnection) between an optical fiber amplifier and a laser pump source.

2. Description of the Prior Art

Fiber optic communication systems, particularly long haul and undersea systems, make extensive use of doped fiber amplifiers to maintain the requisite gain and power in the signal as it traverses the long expanse of the communication fiber. Reliability of the amplifier component, particularly in undersea systems that are inaccessible after deployment (from a practical perspective), has become a key design factor. Additionally, evolving systems utilize high power (e.g., several hundred milliwatts) lasers in the pump sources. In the event of a fiber break in a high power fiber transmission system, the harmful laser emissions from the broken fiber pose an extreme hazard and can cause severe injuries, such as burnt retinas or damage to other living tissues and may cause fires or other property damage. In addition, pumping a high powered laser into a system having broken fiber can severely damage the optical fiber system due to fiber fusion. For many reasons, therefore, it is important to shut down a high power laser as soon as possible after a break or fault occurs in the extended fiber system.

Additionally, during the deployment of the optical system, it is important that remote pump sources remain inactive until the entire system has been connected in the proper arrangement. If a remote pump laser were inadvertently turned "oen" prior to connection to an amplifier, the laser power may damage the operator as well as the system.

SUMMARY OF THE INVENTION

The present invention relates to a safety interlocking system for an optical fiber amplifier and an associated pump source and, more particularly, to a system that prevents the activation of the laser pump sources in the event of a disconnection (or incorrect interconnection) between an optical fiber amplifier and a laser pump source.

In accordance with the present invention, a pump source is configured to include an isolated power supply and control switch. A pair of metallized optical fiber jumper cables are used to interconnect the pump source to the fiber amplifier, where these connections are isolated from each housing. Within the pump source a first metallized fiber is coupled to a first terminal of the isolated power supply and a second metallized fiber is coupled to the control switch, the switch coupled to a remaining terminal of the power supply. A diode is included in the amplifier to form an electrical signal path between the metallized fibers within the amplifier component. The control switch in the pump source is configured to remain "open" unless and until both metallized fibers are properly connected to the amplifier terminals. Once the connection is made, the electrical circuit will be complete and the switch will close. The switch is then used to activate the laser drivers within the pump and, therefore, turn "on" the pump lasers once both fibers are in place.

In a preferred embodiment of the present invention, an optical coupler (for example, a solid state relay) is used as the control switch, the coupler comprising an LED in the electrical signal path and a photo-transistor for converting the optical output from the LED into an electrical control signal useful to activate the laser driver circuits.

A multiple number of such pump sources may be similarly "interlocked" to a single optical fiber amplifier, where each pump source operates independently and includes a separate safety circuit.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
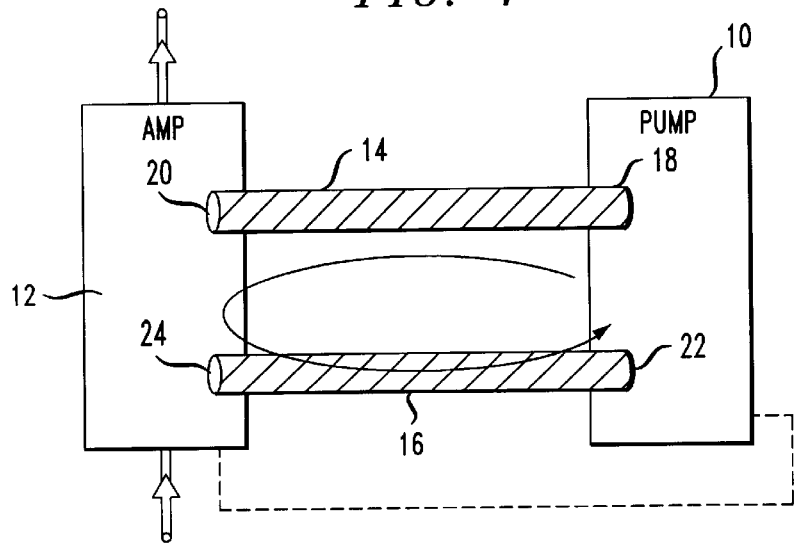
FIG. 1 illustrates a simplified pump source and fiber amplifier, interconnected using a pair of metallized fibers, the interconnection illustrating the circuit path associated with the safety interlocking system of the present invention.

A simplified block diagram of an exemplary optical pump source and doped fiber amplifier incorporating the safety interlocking system of the present invention is shown in FIG. 1. In particular, a pump source 10 is connected to fiber amplifier 12 using a pair of fiber jumper cables 14 and 16. To provide the proper connection between the components, metallized jumper cable 14 must be connected between a first port 18 of pump source 10 and a first port 20 of fiber amplifier 12. Similarly, metallized jumper cable 16 must be connected between a second port 22 of pump source 10 and a second port 24 of fiber amplifier 12. As an alternative to jumper cable 16, the "return" electrical path between amplifier 12 and pump 10 may be completed through a "backplane" connection on the underside of pump 10, as indicated by the dashed line in FIG. 1. A "backplane" connection is defined in the art as a connection to an electrical trace pattern formed on the bottom surface of the substrate supporting the circuitry, in this case, the substrate supporting pump 10. In general, any method of "completing" the electrical path between pump 10 and amplifier 12 is appropriate in accordance with the teachings of the present invention.

In association with the teaching of the present invention, each jumper cable requires an electrical path therethrough, where this path may comprise an outer metal sheathing or coating on the optical fiber (as indicated in FIG. 1) or an electrical wire that is coextensive with the optical fiber jumper cable. Within both pump source 10 and fiber amplifier 12, as will be discussed in detail below, reside components necessary to complete an electrical signal path. That is, an electrical circuit will be formed, as indicated by the arrow, when metallized jumper cables 14 and 16 are properly inserted between pump source 10 and fiber amplifier 12. Importantly, the physical connections between the jumper cables and the housings for pump 10 and amplifier 12 must be completely isolated so that the housing will not become part of the electrical circuit, since the influence of the housing would negate the safety aspect of the present invention. If either cable is missing or broken (or if the ports are cross-connected—that is, if, for example, jumper cable 14 is connected between ports 18 and 24), the electrical path will not be completed and, therefore, no current will flow. Without the electrical current flow, the lasers residing in pump source 10 will not be activated. Thus, in accordance with the present invention, the laser sources are interlocked such that breaking or disconnecting of any portion of the path shown in FIG. 1 will result in immediately turning off the laser sources, ensuring that the pump will be shut down during this situation.

Figure 2:
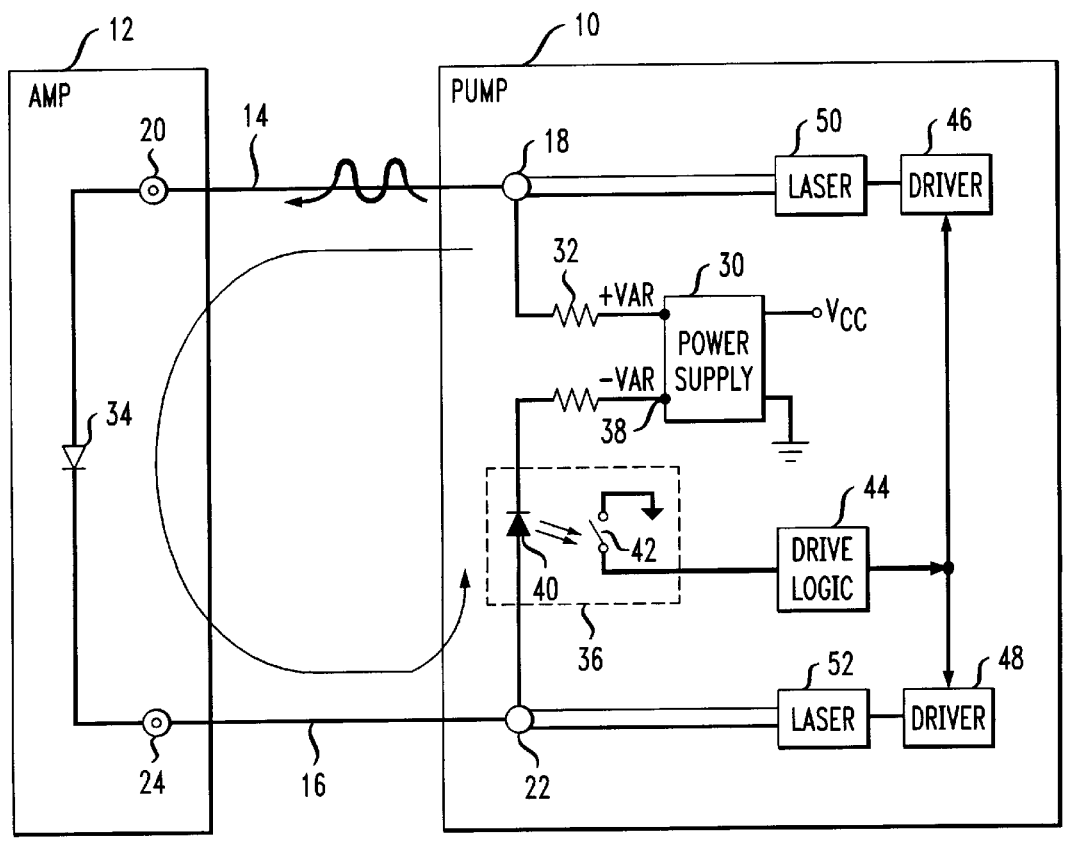
FIG. 2 is a block diagram illustrating an exemplary safety interlocking system formed in accordance with the present invention.

FIG. 2 contains a block diagram illustrating an exemplary safety interlocking system of the present invention. Metallized optical fiber jumper cables 14 and 16 are indicated by the single line drawing in FIG. 2. The isolated connections between cables 14,16 and their respective ports are shown as double circles in FIG. 2. As mentioned above, these connections are required to be electrically isolated so that the housing of either pump source 10 or fiber amplifier 12 will not interfere with the electrical circuit path. An isolated power supply 30 (for example, a 5V power supply) is included within pump 10. A first output from power supply 30, denoted $+V_{out}$ is coupled, through a resistance 32, to isolated port 18 so as to be connected to a first end of metallized fiber jumper cable 14. Referring to the depiction of amplifier 12 in FIG. 2, a diode 34 is shown as coupled between first isolated port 20 and second isolated port 24. Therefore, if metallized fiber jumper cables 14 and 16 are properly connected to these ports 20 and 24, respectively, diode 34 will enable the safety current, $I_{safe}$, to flow through amplifier 12 in the direction indicated in the figure.

Referring back to the depiction of pump 10 in FIG. 2. a control switch 36 is shown as coupled between isolated port 22 and the remaining terminal 38 of power supply 30. In the preferred embodiment of FIG. 2, control switch 36 comprises an optical coupler including an LED 40 and switch 42, where switch 42 remains "open" when no current is flowing and is closed only when LED 40 is activated. Other "isolated" control switching arrangements, such as a transformer including AC bias, may be used in accordance with the present invention. In general, if either jumper cable 14 or 16 is missing or broken (or if cables 14 and 16 are mistakenly cross-coupled), the electrical circuit will not be completed and no current $I_{safe}$ will be present. Under these conditions, LED 40 will remain inactive and switch 42 will remain open. As shown in FIG. 2, the output of switch 42 is used as the control input to a laser driver logic circuit 44, where circuit 44 is used to turn "on" and "off", as the case may be, a pair of laser driver circuits 46 and 48. Driver circuits 46 and 48 are used to turn "on" a pair of pump laser sources 50 and 52, respectively, where the outputs from pump laser sources 50 and 52 are coupled to the optical fiber portion of metallized optical fiber jumper cables 14 and 16, respectively.

Under the proper connection conditions (that is, when metallized fiber jumper cables 14 and 16 are properly installed), the electrical current $I_{safe}$ will flow, activating LED 40, closing switch 42 and turning "on" laser driver logic circuit 44. This activation results in signaling driver circuits 46 and 48 to turn "on" lasers 50 and 52 so that the pump laser signal will exit pump 10, propagate through fibers 14,16 and enter fiber amplifier 12 (where these pump signals are used to amplify an optical transmission signal (not shown) passing through amplifier 12).

Figure 3:
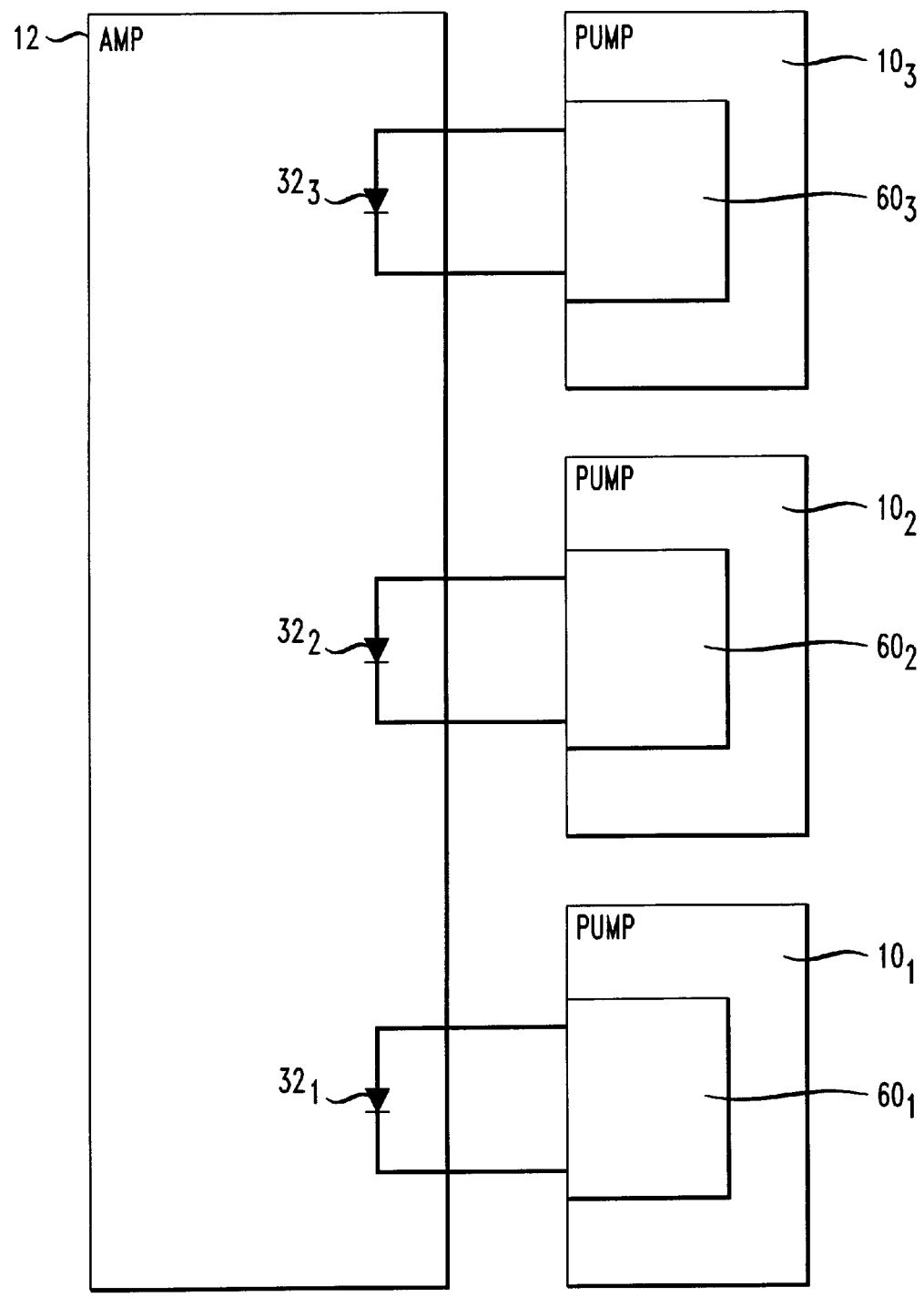
FIG. 3 is an alternative embodiment of the present invention, illustrating a plurality of pump sources and a doped fiber amplifier, each pump source including a safety interlocking connection to the fiber amplifier.

As mentioned above, a multiple number of pump sources may be coupled to a single optical amplifier, for a variety of reasons not germane to the subject matter of the present invention. FIG. 3 illustrates a set of three pump sources, denoted $10_1$, $10_2$ and $10_3$, coupled to a single doped fiber amplifier 12. Each pump source uses a separate pair of metallized fiber jumper cables 14,16 to provide the interconnection, where as discussed above the physical connection between the fiber and the housings needs to be electrically isolated so as not to interfere with the electrical circuit created by the safety components. The diodes 32 included within amplifier 12 between the isolated ports are shown in FIG. 3. Each pump source $10_i$ includes a safety circuit 60 comprising the isolated power supply 30, control switch 36 and driver logic 44 discussed above in association with FIG. 2. In general, any number of pump sources may be connected to an amplifier using the safety interlocking system of the present invention for each pair of metallized jumper fiber cables.

What is claimed is:

1. A safety arrangement for interlocking an optical fiber amplifier and a laser pump source to prevent activation of the laser devices within the pump source unless the amplifier is properly connected to the laser pump source, the safety arrangement comprising a pair of metallized fiber optic jumper cables, a first metallized fiber optic jumper cable for being coupled between a first, electrically isolated port of the pump source and a first, electrically isolated port of the amplifier, and a second, remaining, metallized fiber optic jumper cable for being coupled between a second, isolated port of the pump source and a second, electrically isolated port of the amplifier;

a diode coupled between the first and second isolated amplifier ports;

an isolated power supply including a pair of balanced output terminals, a first output terminal of said pair of terminals connected to the first isolated port of the pump source;

a control switch coupled between the remaining output terminal of said isolated power supply and the second isolated port of said amplifier, said control switch configured to close only when said pair of metallized fiber optic jumper cables is properly attached between the respective ports of the amplifier and pump source; and activation means coupled to the control switching for turning "on" laser sources within the pump source when the control switch closes.

2. A safety arrangement as defined in claim 1 wherein the control switch comprises an optical coupler.

3. A safety arrangement as defined in claim 1 wherein the activation means comprises activation logic circuit coupled to the control switch;

a first laser driver circuit coupled to the output of said logic circuit;

a first laser activated by said first laser driver circuit, said first laser for coupling an optical signal into the first metallized fiber optic jumper cable;

a second laser driver circuit coupled to the output of said logic circuit;

a second laser activated by said second laser driver circuit, said second laser for coupling an optical signal into the second metallized fiber optic jumper cable.

4. A safety arrangement as defined in claim 1 wherein each metallized fiber jumper cable comprises a fiber optical cable including an outer metallized sheathing.

5. A safety arrangement as defined in claim 1 wherein each metallized fiber jumper cable comprises a fiber optical cable including an electrical conducting wire disposed in a coextensive relationship with an optical communication fiber.

6. In an optical communication system, a safety arrangement for interlocking a plurality of pump sources with a doped fiber amplifier, the doped fiber amplifier including a separate pair of electrically isolated ports for interconnecting with each doped fiber amplifier and each doped fiber amplifier including a pair of electrically isolated ports, the safety arrangement comprising for each pump source

- a pair of metallized fiber optic jumper cables, a first metallized fiber optic jumper cable for being coupled between a first, electrically isolated port of the pump source and a first, electrically isolated port of the amplifier, and a second, remaining, metallized fiber optic jumper cable for being coupled between a second, isolated port of the pump source and a second, electrically isolated port of the amplifier;
- a diode coupled between the first and second isolated amplifier ports;
- an isolated power supply including a pair of balanced output terminals, a first output terminal of said pair of terminals connected to the first isolated port of the pump source;
- a control switch coupled between the remaining output terminal of said isolated power supply and the second isolated port of said amplifier, said control switch configured to close only when said pair of metallized fiber optic jumper cables is properly attached between the respective ports of the amplifier and pump source; and
- activation means coupled to the control switching for turning "on" laser sources within the pump source when the control switch closes.

7. A safety arrangement as defined in claim 6 wherein each control switch comprises an optical coupler.

8. A safety arrangement as defined in claim 6 wherein each metallized fiber jumper cable comprises a fiber optical cable including an outer metallized sheathing.

9. A safety arrangement as defined in claim 6 wherein each metallized fiber jumper cable comprises a fiber optical cable including an electrical conducting wire disposed in a coextensive relationship with an optical communication fiber.

10. A safety arrangement for interlocking an optical fiber amplifier and a laser pump source to prevent activation of the laser devices within the pump source unless the amplifier is properly connected to the laser pump source, the safety arrangement comprising

- a metallized fiber optic jumper cable coupled between a first electrically isolated port of the pump source and a first electrically isolated port of the amplifier;
- an electrical connection between a second electrically isolated port of the pump source and a second, electrically isolated port of the amplifier;
- a diode coupled between the first and second isolated amplifier ports;
- an isolated power supply including a pair of balanced output terminals, a first output terminal of said pair of terminals connected to the first isolated port of the pump source;
- a control switch coupled between the remaining output terminal of said isolated power supply and the second isolated port of said amplifier, said control switch configured to close only when said metallized fiber optic juniper cable is properly attached between the respective ports of the amplifier and pump source; and
- activation means coupled to the control switching for turning "on" laser sources within the pump source when the control switch closes.

* * * * *